US011456504B2

(12) United States Patent
Lee et al.

(10) Patent No.: US 11,456,504 B2
(45) Date of Patent: Sep. 27, 2022

(54) BATTERY MODULE INCLUDING UPPER COVER INTEGRATED WITH SIDE COVERS FASTENED TO LOWER COVER, AND MANUFACTURING METHOD THEREOF

(71) Applicant: SK INNOVATION CO., LTD., Seoul (KR)

(72) Inventors: Seung Hun Lee, Daejeon (KR); Yun Joo Noh, Daejeon (KR); Tae Gu Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 273 days.

(21) Appl. No.: 16/785,059

(22) Filed: Feb. 7, 2020

(65) Prior Publication Data

US 2020/0259140 A1 Aug. 13, 2020

(30) Foreign Application Priority Data

Feb. 8, 2019 (KR) .......................... 10-2019-0014976

(51) Int. Cl.
*H01M 50/20* (2021.01)
*H01M 10/613* (2014.01)
*H01M 10/6554* (2014.01)

(52) U.S. Cl.
CPC ......... *H01M 50/20* (2021.01); *H01M 10/613* (2015.04); *H01M 10/6554* (2015.04)

(58) Field of Classification Search
CPC . H01M 50/20; H01M 10/613; H01M 10/6554
USPC .................................................. 429/120, 149
See application file for complete search history.

(56) References Cited

U.S. PATENT DOCUMENTS

| 2013/0183571 A1* | 7/2013 | Miyazaki | H01M 10/613 |
| | | | 429/156 |
| 2017/0054307 A1 | 2/2017 | Kim | |
| 2017/0358785 A1 | 12/2017 | Hattori et al. | |
| 2018/0123199 A1 | 5/2018 | Kubota | |

FOREIGN PATENT DOCUMENTS

| JP | 2009231125 A | 10/2009 | |
| JP | 5227494 | 7/2013 | |
| JP | 2013229182 A * | 11/2013 | .......... H01M 10/647 |
| KR | 10-1029838 | 4/2011 | |
| KR | 10-1326196 | 11/2013 | |
| KR | 10-2017-0040629 | 4/2017 | |
| WO | 2012133711 A1 | 10/2012 | |

OTHER PUBLICATIONS

Extended European Search Report issued by the European Patent Office dated May 7, 2020.

* cited by examiner

*Primary Examiner* — Sean P Cullen
(74) *Attorney, Agent, or Firm* — IP & T Group LLP

(57) ABSTRACT

A battery module which includes: a battery stack formed by stacking a plurality of battery cells respectively including electrode tabs on each other; a pair of side covers disposed on both sides of the battery stack; a lower cover on which the battery stack is placed so that one side of the plurality of battery cells is in contact therewith; and an upper cover disposed on a side opposite to the lower cover with respect to the battery stack; wherein the pair of side covers and the upper cover are integrally formed, and the lower cover is fastened to at least one of the pair of side covers.

12 Claims, 8 Drawing Sheets

BATTERY MODULE INCLUDING UPPER COVER INTEGRATED WITH SIDE COVERS FASTENED TO LOWER COVER, AND MANUFACTURING METHOD THEREOF

CROSS-REFERENCE TO RELATED APPLICATION

This application claims priority to Korean Patent Applications No. 10-2019-0014976 filed on Feb. 8, 2019, the entire disclosure of which is incorporated by reference herein.

BACKGROUND OF THE INVENTION

1. Field of the Invention

One embodiment of the present invention relates to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

As described above, when the plurality of secondary batteries are connected with each other in series to be used in a high-output hybrid vehicle or an electric vehicle, the plurality of secondary batteries are fixed using a member such as a cover or a case, then a plurality of battery cells are electrically connected with each other using a connection member such as a bus bar. Therefore, the plurality of secondary batteries may be used as one battery module form.

At this time, maximizing space utilization to improve an energy density with respect to a volume of the battery module is a main concern in the development of the battery module, and in the conventional case, a method of stacking and housing a plurality of secondary batteries in a longitudinal direction in a module housing has mainly been used. However, the conventional module housing has a problem that a plurality of exterior case members are required, and it is not easy to assemble the exterior case members and a battery stack.

PRIOR ART DOCUMENT

[Patent Document]
(Patent Document 1) Korean Patent Registration Publication No. 10-1326196 (Nov. 7, 2013)

SUMMARY OF THE INVENTION

It is an object of embodiments of the present invention to provide a battery module and a manufacturing method thereof, which may suppress a damage in a case unit due to an expansion of battery cells housed in the case unit.

In addition, another object of the embodiments of the present invention is to provide a battery module and a manufacturing method thereof, which may avoid an interference between a battery stack and a case unit in processes of housing the battery stack and assembling the case unit.

Further, another object of the embodiments of the present invention is to provide a battery module and a manufacturing method thereof, in which one side of each of side covers forming a case unit may be formed so as to surround a portion of an outer surface of a lower cover, thus to improve a structural rigidity thereof.

To achieve the above objects, according to an aspect of the present invention, there is provided a battery module including: a battery stack formed by stacking a plurality of battery cells respectively including electrode tabs on each other; a pair of side covers disposed on both sides of the battery stack; a lower cover on which the battery stack is placed so that one side of the plurality of battery cells is in contact therewith; and an upper cover disposed on a side opposite to the lower cover with respect to the battery stack; wherein the pair of side covers and the upper cover are integrally formed, and the lower cover is fastened to at least one of the pair of side covers.

At least one of the pair of side covers may include a binding portion formed at a lower end thereof on the lower cover side, which extends therefrom so as to surround at least a portion of an outer surface of the lower cover.

The lower cover may include a stepped portion formed therein in a stepped shape inward from a lower surface thereof on at least one side of both sides of the battery stack, wherein the binding portion may be formed so as to surround the stepped portion.

As the battery module is placed on an external cooling pack, the binding portion may be disposed between the lower cover and the cooling pack.

The stepped portion and the binding portion may be bound to each other by a fastening member fastened in a direction perpendicular to the lower cover.

The pair of side covers may be disposed on both sides of the battery stack in a direction in which the battery cells are stacked ('stacking direction of the battery cells').

At least one of the pair of side covers may be compressed to the battery stack side in the stacking direction of the battery cells.

The lower cover may be formed of a cooling plate made of aluminum (Al).

According to another aspect of the present invention, there is provided a method of manufacturing a battery module, including: stacking a plurality of battery cells respectively including electrode tabs on each other to form a battery stack; placing the battery stack on a lower cover so that one side of the plurality of battery cells is in contact therewith; and disposing a pair of side covers on both sides of the battery stack in the stacking direction of the battery cells, wherein a distance between lower ends of each of the pair of side covers on the lower cover side is greater than a width of the lower cover in the stacking direction of the battery cells.

The pair of side covers may be integrally formed with an upper cover disposed on a side opposite to the lower cover with respect to the battery stack, and the integrated upper cover and the pair of side covers may have a shape in which a portion thereof on the lower cover side is opened, respectively.

After the pair of side covers are disposed, at least one of the pair of side covers may be compressed so as to surround both sides of the battery stack in the stacking direction of the battery cells.

A binding portion may be formed at a lower end of at least one of the pair of side covers on the lower cover side, which extends therefrom to the lower cover side, and the binding portion is located so as to surround at least a portion of an outer surface of the lower cover according to the compression.

A stepped portion may be formed in the lower cover in a stepped shape inward from a lower surface thereof on at least one side of both sides of the battery stack in the stacking direction, and the binding portion may be located so as to surround the stepped portion.

The stepped portion and the binding portion may be bound to each other by a fastening member fastened in a direction perpendicular to the lower cover.

According to embodiments of the present invention, it is possible to suppress a damage in the case unit due to an expansion of the battery cells housed in the case unit.

In addition, according to embodiments of the present invention, it is possible to avoid an interference between the battery stack and the case unit in the processes of housing the battery stack and assembling the case unit.

Further, according to embodiments of the present invention, since one side of each of the side covers forming the case unit is formed so as to surround a portion of an outer surface of the lower cover, a structural rigidity thereof may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
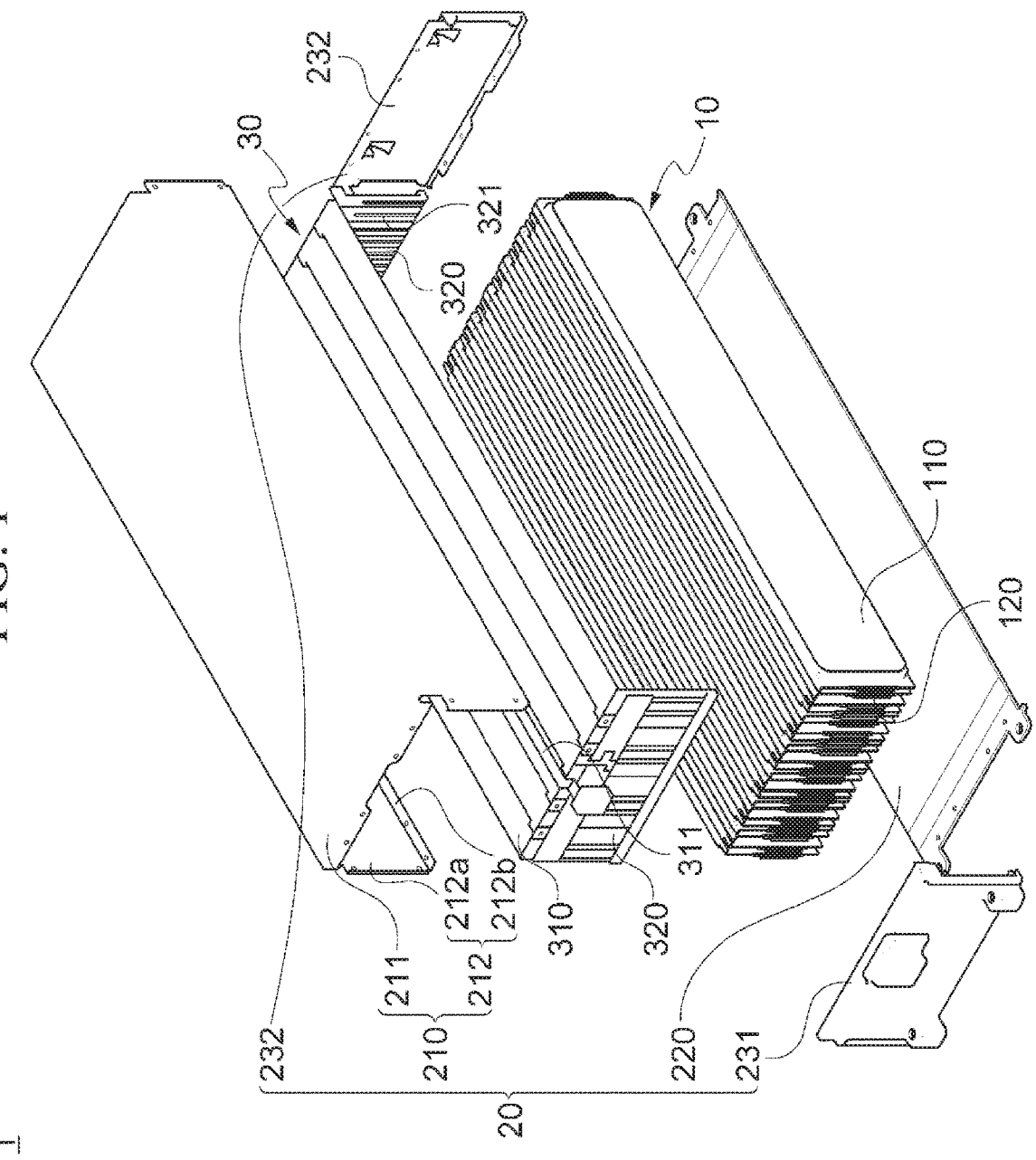
FIG. 1 is an exploded perspective view of a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

FIG. 1 is an exploded perspective view of a battery module 1 according to an embodiment of the present invention.

Referring to FIG. 1, the battery module 1 according to the embodiment of the present invention may include: a battery stack 10 formed by stacking a plurality of battery cells 110 on each other; a pair of side covers 212 disposed on both sides of the battery stack 10; and a lower cover 220 on which the battery stack 10 is placed so that one side of the plurality of battery cells 110 is in contact therewith.

Each of the above-described battery cells 110 may include electrode tabs 120 which are drawn out on one side or both sides thereof. At this time, the battery stack 10 may be disposed so that a direction in which the electrode tabs 120 of the battery cell 110 are drawn out, and a direction in which the battery cells 110 are stacked ('stacking direction of the battery cells 110') are parallel to a surface of the ground, and the lower cover 220 may be located so as to be in contact with a lower surface of the battery stack 10.

Meanwhile, the battery module 1 according to the embodiment of the present invention may further include an upper cover 211 disposed on a side opposite to the lower cover 220 (that is, an upper side of the battery stack 10) with respect to the battery stack 10. The upper cover 211 may be integrally formed with the above-described pair of side covers 212, and the integrally formed upper cover 211 and the pair of side covers 212 may form an upper case 210. At this time, each of the lower cover 220 and the upper cover 211 may be disposed in parallel to the stacking direction of the plurality of battery cells 110, and the pair of side covers 212 may be located on both sides of the battery stack 10 in the stacking direction of the battery cells 110, respectively.

In addition, the lower cover 220 may be mutually fastened to at least one of the pair of side covers 212. Specifically, at least one end portion of both end portions of the lower cover 220 on the pair of side covers 212 sides may be fastened to the side cover 212 adjacent thereto. At this time, the other end portion of the above-described both end portions of the lower cover 220, which is not fastened to the side cover 212, may be integrally formed with the side cover 212 adjacent thereto.

That is, when both end portions of the lower cover 220 on the pair of side covers 212 sides are mutually fastened to the adjacent side covers 212, the lower cover 220 may not be integrally formed with the side covers 212, and may be formed in separate components. However, it is merely an example, and when one end portion of both ends of the lower cover 220 on the pair of side covers 212 sides is fastened to the side cover 212 adjacent thereto, the other one end portion may be integrally formed with the remaining side cover 212.

Meanwhile, at least one of the above-described pair of side covers 212 may include a binding portion 212b formed at a lower end thereof on the lower cover 220 side, which extends therefrom so as to surround at least a portion of an outer surface of the lower cover 220.

More specifically, as described above, when the pair of side covers 212 and the lower cover 220 are formed in the separate components, the binding portion 212b may be formed at each lower end of the pair of side covers 212. However, when any one of the pair of side covers 212 is formed integrally with one end portion of the lower cover 220, the binding portion 212b may be formed only at the lower end of the other of the pair of side covers 212.

At this time, the side cover 212 may include side cover members 212a surrounding both sides of the battery stack 10 in the stacking direction of the battery cells 110, and the above-described binding portion 212b may be formed by extending from a lower end of the side cover member 212a on the lower cover 220 side toward the lower cover 220.

In addition, the above-described binding portion 212b may be formed by bending the lower end of the side cover member 212a, and preferably may be formed by bending at a right angle. Thereby, the binding portions 212b may be located so as to surround the outer surfaces of the lower cover 220, and more preferably, may be in surface contact with at least a portion of the outer surfaces of the lower cover 220. The binding portion 212b will be described in detail below.

Meanwhile, the battery module 1 according to the embodiment of the present invention may further include: a bus bar assembly 320 located on both sides of the battery stack 10 in the direction in which the electrode tabs 120 are drawn out; and an upper assembly 310 located on a side opposite to the lower cover 220 with respect to the battery stack 10.

In this case, the above-described bus bar assembly 320 may have a plurality of bus bar holes 321 formed therein, and the bus bar assembly 320 may be disposed in contact with the plurality of electrode tabs 120. In addition, the plurality of electrode tabs 120 may be connected to the bus bar assembly 320 through the plurality of bus bar holes 321. The above-described electrode tab 120 and the bus bar hole 321 may be connected to each other by laser welding, but this is merely an example, and it is not limited thereto.

Furthermore, the above-described upper assembly 310 may be disposed between an upper surface of the battery stack 10 and the above-described upper cover 211 on the upper side of the battery stack 10. At this time, by providing an elastic pad (not illustrated) having an elastic repulsive force on a contact surface of the upper assembly 310 with the battery stack 10, the battery stack 10 may be pressed to the lower cover 220 side, and thereby increasing the surface contact between the lower cover 220 and the battery stack 10.

In addition, the upper assembly 310 may include a connector 311 which electrically connects the bus bar assemblies 320 on both sides of the above-described battery stack 10. The connector 311 may be formed of a wire or a flexible printed circuit board (FBCB) for transmitting and receiving electrical signals, and may transmit voltage or temperature sensing signals measured from a pair of bus bar assemblies 320 to a control circuit (not illustrated) and the like. The control circuit may determine voltage and temperature states of the plurality of battery cells 110 through the received voltage or temperature sensing signals.

Meanwhile, the above-described bus bar assemblies 320 on the both sides and the upper assembly 310 may be integrally formed, and the integrally formed bus bar assemblies 320 and the upper assembly 310 may form an upper structure 30.

Furthermore, the battery module 1 according to the embodiment of the present invention may further include a front cover 231 disposed on one side of the battery stack 10 in the direction in which the electrode tabs 120 are drawn out and a rear cover 232 disposed on the other side. In this case, the above-described bus bar assembly 320 may be located between each of the front cover 231 and the rear cover 232 and the battery stack 10.

Meanwhile, the upper case 210, the lower cover 220, the front cover 231, and the rear cover 232 may be located so as to surround six surfaces of the battery stack 10, and are fastened to each other to form a case unit 20 in which the battery stack 10 is housed. The case unit 20 may protect the plurality of battery cells 110 from an external impact or foreign matters.

Figure 2:
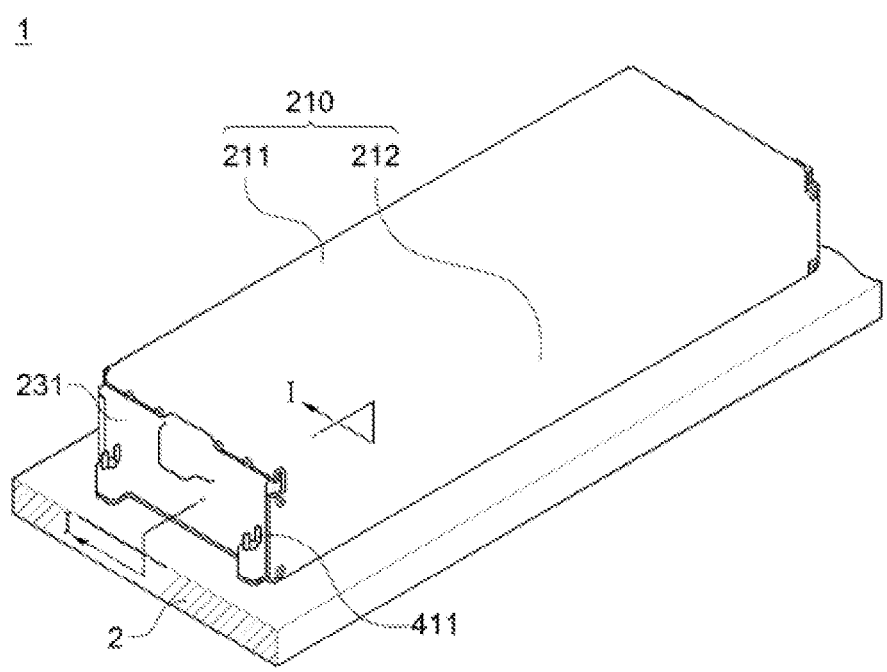
FIG. 2 is a perspective view illustrating a state in which the battery module according to the embodiment of the present invention is placed on an external cooling pack.
Figure 3:
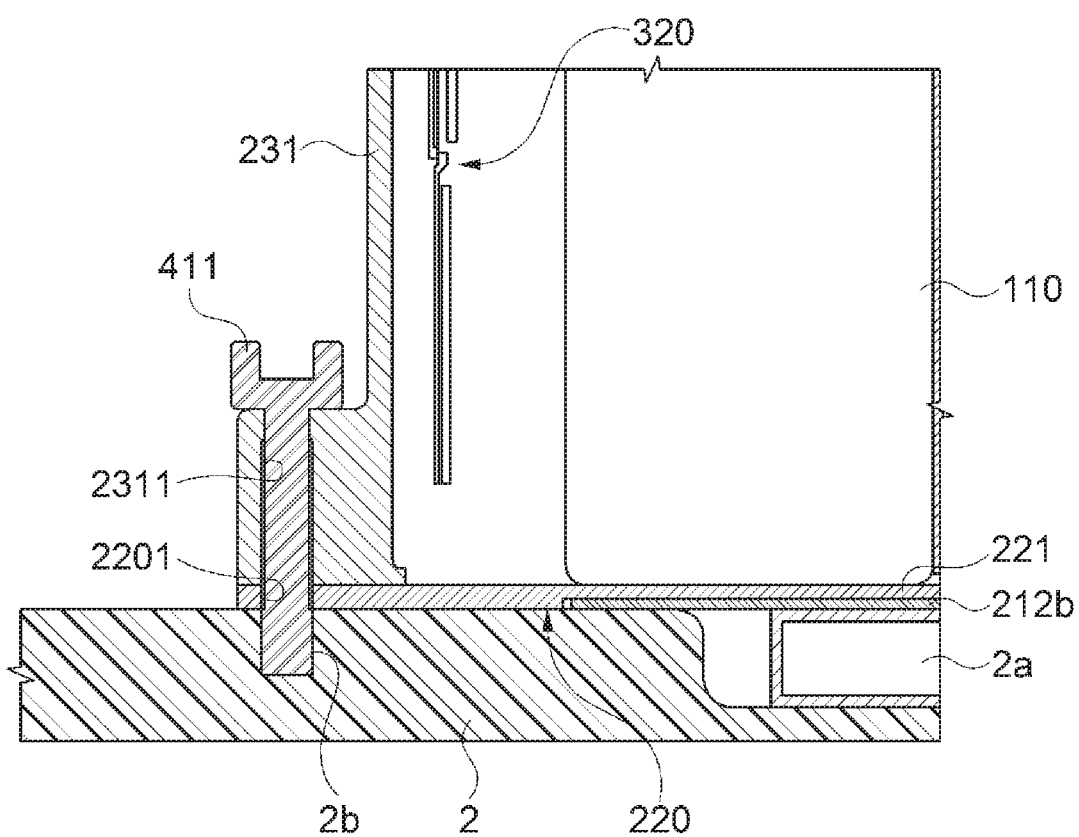
FIG. 3 is a cross-sectional view taken on line I-I in FIG. 2.

FIG. 2 is a perspective view illustrating a state in which the battery module 1 according to the embodiment of the present invention is placed on an external cooling pack 2, and FIG. 3 is a cross-sectional view taken on line I-I in FIG. 2.

Referring to FIGS. 2 and 3, the above-described lower cover 220 may include a stepped portion 221 formed therein in a stepped shape inward from a lower surface thereof on at least one side (a side opposite to the side facing the battery stack 10) of both sides of the battery stack in the stacking direction of the battery cells 110. At this time, in the above-described lower cover 220, the stepped portion 221 in a direction perpendicular to the surface of the ground may be formed in a thickness (T1 shown in FIG. 5) thinner than a thickness (T2 shown in FIG. 5) of the remaining place where the stepped portion 221 is not formed.

In addition, the above-described stepped portion 221 may be formed at a lower end of the lower cover 220 on the side cover 212 side. In this case, the above-described binding portion 212b of the side cover 212 may be disposed on the stepped portion 221, and the binding portion 212b may be located in contact so as to surround the stepped portion 221. Meanwhile, as the binding portion 212b is disposed in contact on the stepped portion 221, an outer surface (a lower surface in the drawing) of the lower cover 220 and an outer surface (a lower surface in the drawing) of the binding portion 212b may be located on the same plane.

In addition, the stepped portion 221 is illustrated as being formed on both sides of the lower cover 220 in the stacking direction of the battery cells 110 in the drawings, but this is merely an example, and it is not limited thereto. For example, the stepped portion 221 may be formed only on one side of the both sides of the lower cover 220 in the stacking direction of the battery cell 110.

Meanwhile, at least one first fastening hole 2311 may be formed in the front cover 231 and the rear cover 232 by penetrating in a direction perpendicular to the lower cover 220, and correspondingly, at least one second fastening hole 2201 may be formed in the lower cover 220 by penetrating in the direction perpendicular to the lower cover 220.

The above-described at least one first fastening hole 2311 and the at least one second fastening hole 2201 may be disposed coaxially with each other, and may be bound to each other by at least one first fastening member 411 inserted therein in the direction perpendicular to the lower cover 220.

Meanwhile, the battery module 1 according to the embodiment of the present invention may be disposed on the cooling pack 2 to be cooled. Specifically, the above-described cooling pack 2 may have a flow path 2a formed therein, through which a coolant flows, and the battery module 1 placed in contact with the cooling pack 2 may be cooled by the coolant introduced into the flow path 2a from an outside.

In this case, the above-described lower cover 220 may be formed of a cooling plate made of aluminum (Al). That is, as the battery module 1 according to the embodiment of the present invention is placed on the cooling pack 2, the lower cover 220 may be in surface contact with the cooling pack 2, and heat generated from the plurality of battery cells 110 housed in the case unit 20 may be conducted to the cooling pack 2 through the lower cover 220.

Furthermore, at least one third fastening hole 2b corresponding to the first fastening hole 2311 and the second fastening hole 2201 may be formed in the cooling pack 2, and the battery module 1 according to the embodiment of the present invention may be bound to and supported on the cooling pack 2 by the first fastening member 411 inserted into the first fastening hole 2311, the second fastening hole 2201, and the third fastening hole 2b.

At this time, the above-described binding portion 212b may be located with being interposed between the lower cover 220 and the cooling pack 2, and may be vertically pressed and supported by the lower cover 220 and the cooling pack 2 by fastening the above-described first fastening member 411. Thereby, a structural rigidity between the lower cover 220 and the side covers 212 which are fastened to each other may be increased.

Figure 4:
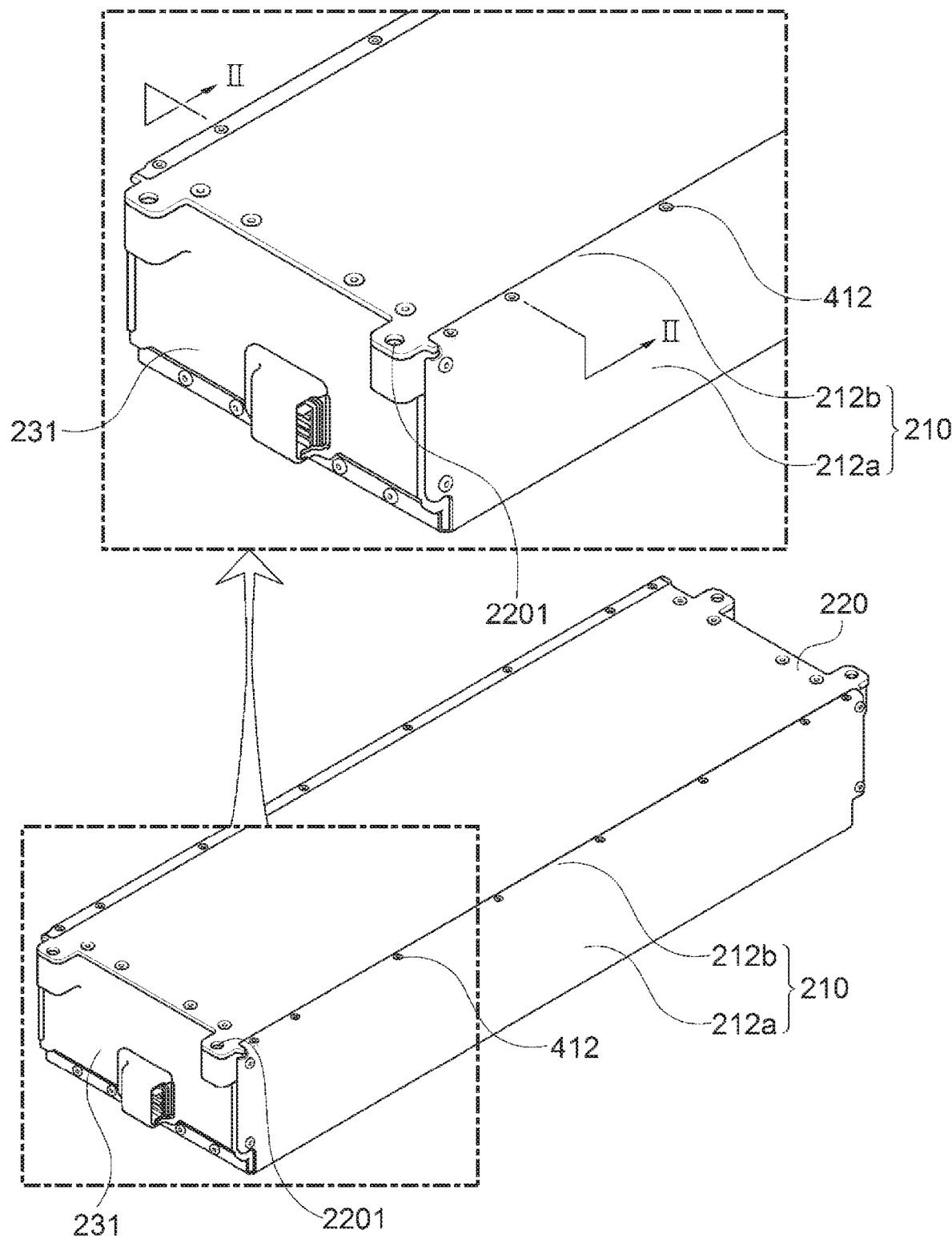
FIG. 4 is a bottom perspective view of the battery module according to the embodiment of the present invention.
Figure 5:
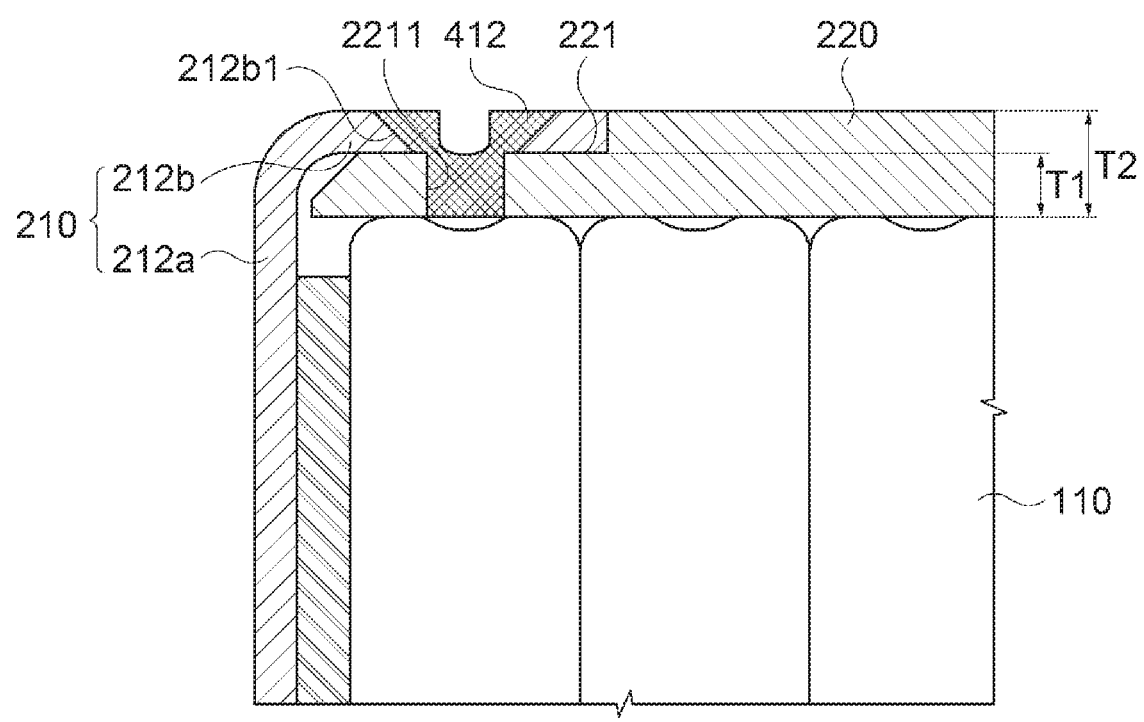
FIG. 5 is a cross-sectional view taken on line II-II of the battery module according to the embodiment of the present invention.

FIG. 4 is a bottom perspective view of the battery module 1 according to the embodiment of the present invention, and FIG. 5 is a cross-sectional view taken on line II-II of the battery module 1 according to the embodiment of the present invention. FIG. 5 is an enlarged cross-sectional view of an upper left portion taken on II-II in FIG. 4.

Referring to FIGS. 4 and 5, at least one first binding hole 212b1 may be formed in the above-described binding portion 212b by penetrating in the direction perpendicular to the lower cover 220, and at least one second binding hole 2211 arranged coaxial with the above-described first binding hole 212b1 may be formed in the stepped portion 221 of the lower cover 220.

In this case, at least one second fastening member 412 may be inserted into and fastened to the first binding hole 212b1 and the second binding hole 2211 arranged coaxial with each other. Specifically, the second fastening member 412 may be inserted into the first binding hole 212b1 and the second binding hole 2211 in the direction perpendicular to the lower cover 220, and the stepped portion 221 and the binding portion 212b may be bound to each other by the second fastening member 412.

As described above, the at least one second fastening member 412 may be fastened in the direction perpendicular to the lower cover 220, and may be fastened perpendicular to the stack direction of the battery cells 110. That is, expansion directions of the second fastening member 412 and the battery cell 110 are orthogonal to each other, such that the side cover 212 fastened to the lower cover 220 by the binding portion 212b may more effectively suppress an expansion of the battery cell 110. In addition, the possibility of damage to the case unit 20 due to the expansion of the battery cell 110 may be reduced.

Figure 6A:
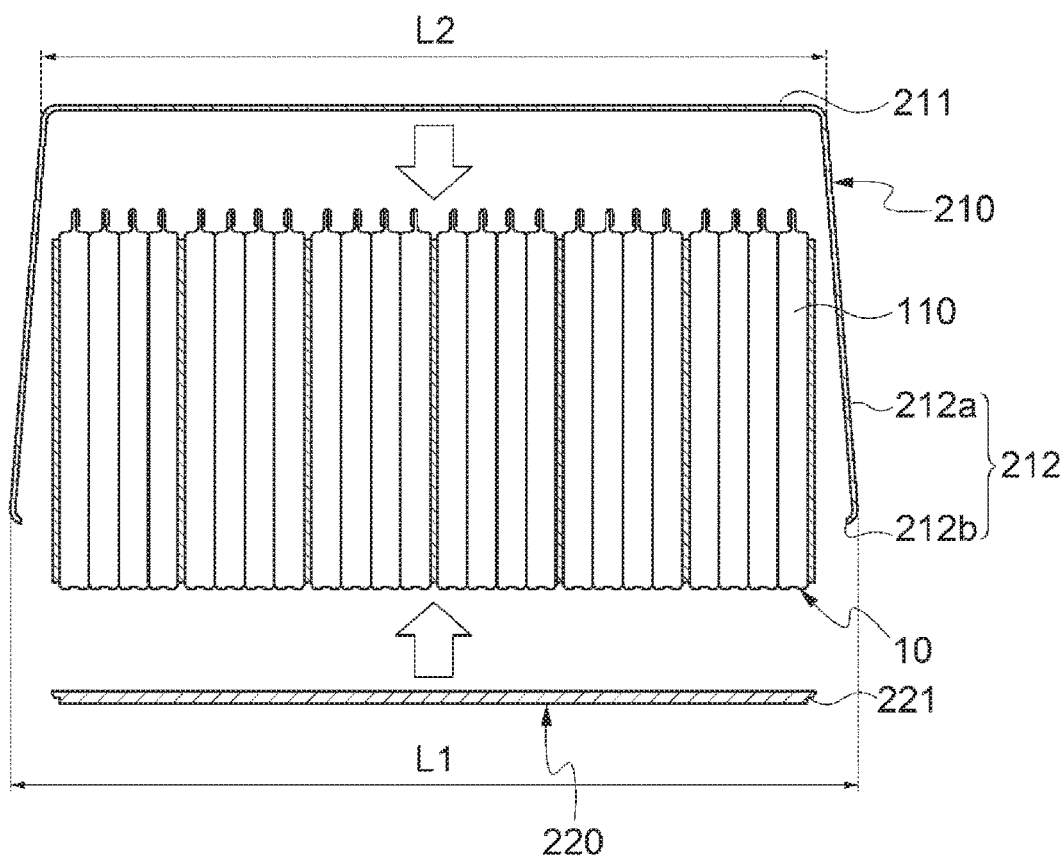
FIG. 6A is a cross-sectional view illustrating a state in which a lower cover and an upper case are disposed outside a battery stack according to another embodiment of the present invention, and 6B is a cross-sectional view illustrating a state in which a pair of side covers of the battery stack according to another embodiment of the present invention are pressed.
Figure 6B:
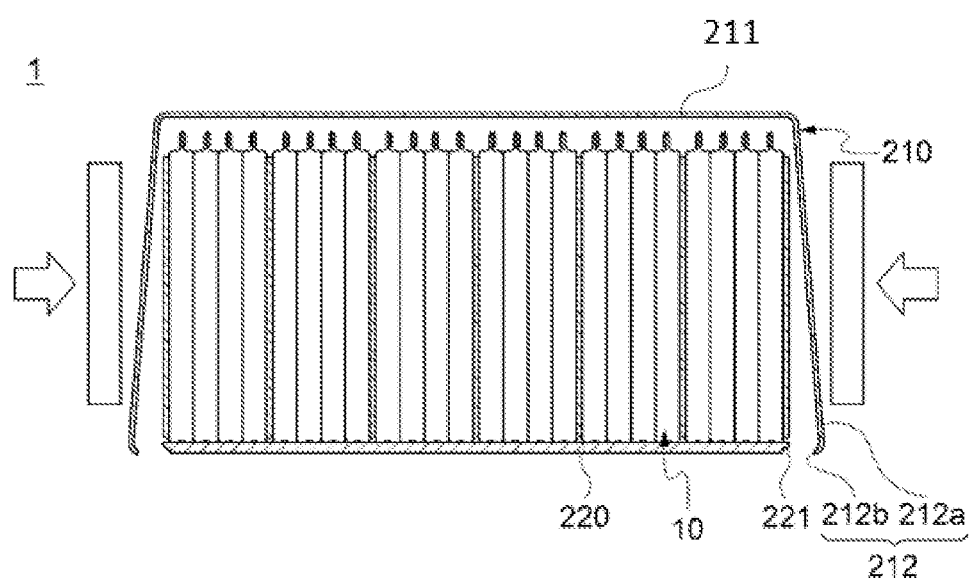

FIG. 6A is a cross-sectional view illustrating a state in which the lower cover 220 and the upper case 210 are disposed outside the battery stack 10 according to another embodiment of the present invention, and 6B is a cross-sectional view illustrating a state in which the pair of side covers 212 of the battery stack according to another embodiment of the present invention are pressed.

Referring to FIGS. 6A and B, in the above-described battery module 1 according to the embodiment of the present invention, a plurality of battery cells 110 respectively including electrode tabs 120 may be stacked on each other to from a battery stack 10 according to another embodiment of the present invention. Thereafter, the battery stack 10 may be placed on the lower cover 220 so that one side of each of the battery cells 110 is in contact therewith, and a pair of side covers 212 may be disposed on both sides of the battery stack 10 in the stacking direction of the battery cells 110.

At this time, a distance L1 between lower ends of each of the pair of side covers 212 on the lower cover 220 side may be greater than a width of the lower cover 220 in the stacking direction of the battery cells 110. That is, a distance L2 between upper ends of the pair of side covers 212 may be shorter than the distance L1 between the lower ends thereof.

Furthermore, the above-described upper cover 211 may be disposed on the upper side of the battery stack 10, and the upper cover 211 may be integrally formed with the pair of side covers 212 to form the upper case 210. In this case, the upper structure 30 may be formed in a "U" shape whose lower side is opened, and the distance L1 between the lower ends of the pair of side covers 212 may be formed larger than the distance L2 between the upper ends of side covers corresponding to the width of the upper cover 211 in the stacking direction of the battery cells 110.

As described above, the distance L1 between the lower ends of the side covers 212 corresponding to a width of a lower side of the upper case 210 in the stacking direction of the battery cells 110 may be formed larger than the distance L2 between the upper ends of the side covers 212 corresponding to a width of an upper side thereof, such that interferences between the side and lower covers 212 and 220 and the battery stack 10 may be easily avoided during housing the battery stack 10 through an open side of the upper case 210.

After the pair of side covers 212 are disposed on both sides in the stacking direction of the battery stack 10, the pair of side covers 212 may be pressed to the battery stack 10 side. Specifically, the pair of side covers 212 may be pressed in the stacking direction of the battery cells 110 so as to surround both sides of the battery stack 10, and the side covers 212 may be pressed so as to abut both outer surfaces of the battery stack 10.

As described above, since the battery module 1 according to the embodiment of the present invention is formed by pressing the side covers 212 of the U-shaped upper case 210, even when the thickness of the battery stack 10 is not uniform between manufacturing processes, a tolerance in the thickness of the battery cell 110 may be absorbed by a predetermined pressure due to the compression of the side covers 212.

Meanwhile, the upper case 210 may be formed of a material having a strength that the side covers 212 may be sufficiently compressed according to the external compression thereof.

Further, the binding portion 212b formed at the lower end of the side cover 212 on the lower cover 220 side may be located so as to surround at least a portion of the outer surface of the lower cover 220 according to the compression of the side covers 212. More specifically, as the side covers 212 are compressed, the binding portion 212b may be located on the stepped portion 221 of the lower cover 220 so as to surround the stepped portion 221.

Thereafter, the binding portion 212b and the stepped portion 221 may be bound to each other by inserting and fastening the second fastening member 412 into at least one first binding hole 212b1 formed in the binding portion 212b and at least one second binding hole 2211 formed in the stepped portion 221. At this time, the second fastening member 412 may be inserted in the direction perpendicular to the lower cover 220.

Meanwhile, the binding method between the above-described binding portion 212b and the stepped portion 221 by the second fastening member 412 is merely an example, and it is not limited thereto. Any method such as seaming, hemming, clinching, hooking and adhesion by an adhesive may be used so long as it can bind the binding portion 212b and the stepped portion 221 to each other.

Figure 7:
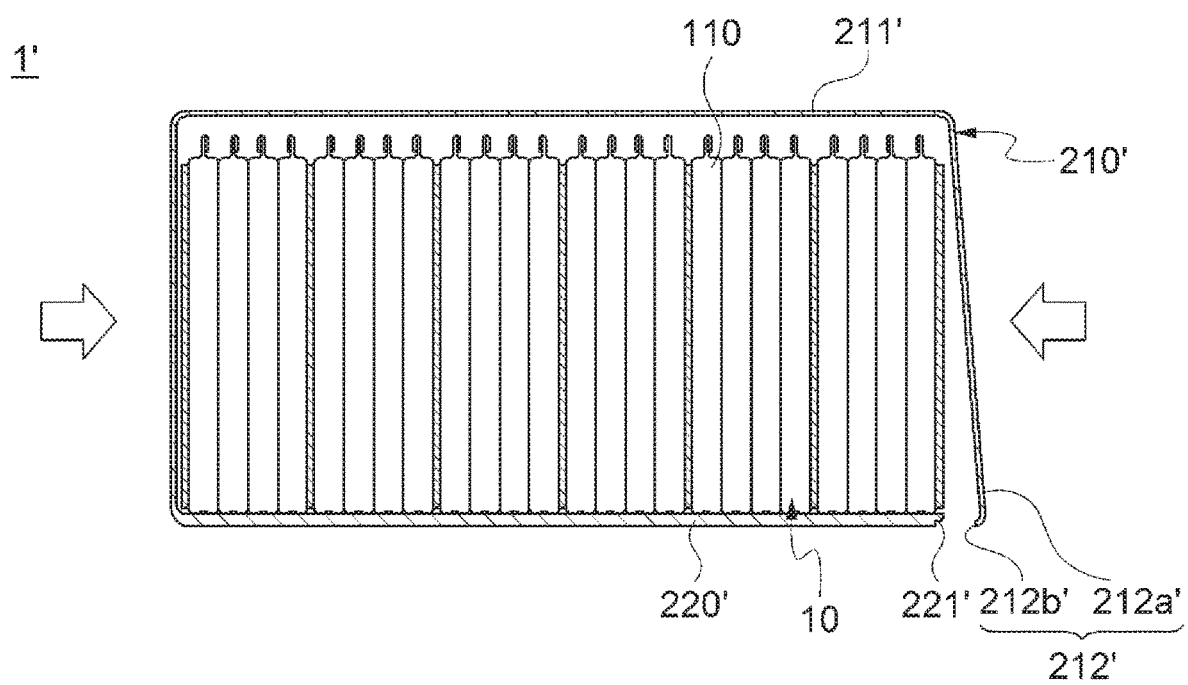
FIG. 7 is a cross-sectional view illustrating a state in which a side cover of a battery stack according to another embodiment of the present invention is pressed.

FIG. 7 is a cross-sectional view illustrating a state in which a side cover 212' of a battery stack according to another embodiment of the present invention is pressed.

Referring to FIG. 7, the lower cover 220' may be extended from a lower end of the side cover 220' of the upper case 210'. In other words, one end portion of a lower cover 220' in the stacking direction of the battery cells 110 may be integrally formed with lower ends of side covers 212' adjacent thereto according to another embodiment of the present invention. In this case, the other end portion of the lower cover 220' in the stacking direction may be opened without being connected to the side cover 212'. The above-described battery stack 10 may be housed inwardly through an open side formed in the direction in which the electrode tabs 120 are drawn out with respect to the integrated structure of the side covers 212', an upper cover 211' and the lower cover 220'.

Thereafter, as in the above-described embodiment of the present invention, the side covers 212' may be compressed on both sides of the battery stack 10 by pressing the pair of side covers 212' in the stacking direction of the battery cells 110. At this time, a binding portion 212b' of the side cover 212' may be disposed on a stepped portion 221' of the lower cover 220', and the binding portion 212b' and the stepped portion 221' may be bound to each other to form a battery module 1'.

Meanwhile, details of the battery stack 10, the upper cover 211', the side covers 212' (212a' and 212b'), and the lower cover 220' are the same as those of the battery stack 10, the upper cover 211, the side covers 212, and the lower cover 220 of the battery module 1 according to the above-described embodiment of the present invention, and therefore will not be described in detail herein.

Although the representative embodiments of the present invention have been described in detail, it will be understood by persons who have a common knowledge in the technical field to which the present invention pertains that various modifications and variations may be made therein without departing from the scope of the present invention.

Accordingly, the scope of the present invention should not be limited to the embodiments, but be defined by the appended claims as well as equivalents thereof.

DESCRIPTION OF REFERENCE NUMERALS 1, 1': Battery module
10: Battery stack
110: Battery cell
120: Electrode tab
20: Case unit
210: Upper case
211, 211': Upper cover
212, 212': Side cover
212a, 212a': Side cover member
212b, 212b': Binding portion
212b1: First binding hole
220, 220': Lower cover
2201: Second fastening hole
221, 221': Stepped portion
2211: Second binding hole
231: Front cover
2311: First fastening hole
232: Rear cover
30: Upper structure
310: Upper assembly
311: Connector
320: Bus bar assembly
321: Bus bar hole
411: First fastening member
412: Second fastening member
2: Cooling pack
2a: Flow path
2b: Third fastening hole
T1: Thickness of stepped portion
T2: Thickness of lower cover
L1: Distance between lower ends of side cover
L2: Distance between upper ends of side cover

What is claimed is:

1. A battery module comprising:
   a battery stack including a plurality of battery cells being stacked, each of the plurality of battery cells having electrode tabs;
   a pair of side covers disposed on both sides of the battery stack;
   a lower cover on which the battery stack is placed so that one side of the plurality of battery cells is in contact therewith; and
   an upper cover disposed on a side opposite to the lower cover with respect to the battery stack;
   wherein the pair of side covers and the upper cover are integrally formed,
   wherein at least one of the pair of side covers includes a binding portion positioned at a lower end portion of the at least one of the pair of side covers,
   wherein the lower cover includes a stepped portion formed at an end portion of the lower cover, the stepped portion being depressed upward from a bottom surface of the lower cover, and
   wherein the binding portion is positioned beneath the stepped portion and coupled to the stepped portion,
   wherein the binding portion includes a first binding hole,
   wherein the stepped portion includes a second binding hole communicated with the first binding hole,
   wherein a fastening member is inserted into the first binding hole and the second binding hole, and
   wherein a diameter of the first binding hole is greater than a diameter of the second binding hole.

2. The battery module according to claim 1, wherein the lower cover is formed of a cooling plate made of aluminum (Al).

3. The battery module according to claim 1, wherein one of the pair of side covers, the plurality of battery cells, and another of the pair of side covers, are positioned sequentially.

4. The battery module according to claim 3, wherein at least one of the pair of side covers is pressed to the battery stack.

5. The battery module according to claim 1, wherein the diameter of the first binding hole becomes narrower in a direction from a lower surface of the binding portion toward the second binding hole.

6. The battery module according to claim 5, wherein, as the battery module is placed on an external cooling pack, the binding portion is disposed between the stepped portion and the cooling pack.

7. The battery module according to claim 5, wherein the stepped portion and the binding portion are bound to each other by the fastening member.

8. A method of manufacturing a battery module comprising:
stacking a plurality of battery cells respectively including electrode tabs to form a battery stack;
placing the battery stack on a lower cover so that one side of the plurality of battery cells is in contact therewith;
disposing a pair of side covers on both sides of the battery stack; and
disposing the lower cover between the pair of side covers,
wherein the plurality of battery cells is stacked from one of the both sides of the battery stack to another of the both sides of the battery stack,
wherein at least one of the pair of side covers includes a binding portion positioned at a lower end portion of the at least one of the pair of side covers,
wherein the lower cover includes a stepped portion formed at an end portion of the lower cover, the stepped portion being depressed upward from a bottom surface of the lower cover, and
wherein the binding portion is positioned beneath the stepped portion and coupled to the stepped portion,
wherein the binding portion includes a first binding hole,
wherein the stepped portion includes a second binding hole communicated with the first binding hole,
wherein a fastening member is inserted into the first binding hole and the second binding hole, and
wherein a diameter of the first binding hole is greater than a diameter of the second binding hole.

9. The method of manufacturing a battery module according to claim 8, wherein, after the pair of side covers are disposed, at least one of the pair of side covers is pressed to the battery stack.

10. The method of manufacturing a battery module according to claim 8, wherein the pair of side covers are integrally formed with an upper cover disposed on a side opposite to the lower cover with respect to the battery stack, and
wherein the plurality of battery cells is stacked from one of the both sides of the battery stack to another of the both sides of the battery pack.

11. The method of manufacturing a battery module according to claim 8, wherein the diameter of the first binding hole becomes narrower in a direction from a lower surface of the binding portion toward the second binding hole.

12. The method of manufacturing a battery module according to claim 11, wherein the stepped portion and the binding portion are bound to each other by the fastening member.

* * * * *